(12) United States Patent
Edgar et al.

(10) Patent No.: US 11,461,709 B2
(45) Date of Patent: Oct. 4, 2022

(54) RESOURCE CAPACITY PLANNING SYSTEM

(71) Applicant: OPTRILO, INC., Seattle, WA (US)

(72) Inventors: Timothy Matthew Edgar, Bellevue, WA (US); Andrew Leo Dupertuis, Bellevue, WA (US); Michael J. Miles, Duvall, WA (US)

(73) Assignee: Optrilo, Inc., Dover, DE (US)

( * ) Notice: Subject to any disclaimer, the term of this patent is extended or adjusted under 35 U.S.C. 154(b) by 0 days.

(21) Appl. No.: 16/932,569

(22) Filed: Jul. 17, 2020

(65) Prior Publication Data

US 2021/0334713 A1 Oct. 28, 2021

Related U.S. Application Data

(60) Provisional application No. 63/016,812, filed on Apr. 28, 2020.

(51) Int. Cl.
*G06Q 10/04* (2012.01)
*G06N 3/02* (2006.01)
*G06Q 10/06* (2012.01)
*G06Q 10/08* (2012.01)

(52) U.S. Cl.
CPC .............. *G06Q 10/04* (2013.01); *G06N 3/02* (2013.01); *G06Q 10/0631* (2013.01); *G06Q 10/0838* (2013.01)

(58) Field of Classification Search
CPC .................................................... G06Q 10/04
See application file for complete search history.

(56) References Cited

U.S. PATENT DOCUMENTS

| 7,418,409 | B1* | 8/2008 | Goel ...................... G06Q 10/02 |
| | | | 705/26.61 |
| 7,742,940 | B1* | 6/2010 | Shan ...................... G06Q 10/04 |
| | | | 705/7.31 |
| 2004/0162748 | A1 | 8/2004 | Vogel et al. |
| 2007/0073576 | A1 | 3/2007 | Connors et al. |
| 2008/0275796 | A1 | 11/2008 | Katircioglu |
| 2012/0221485 | A1* | 8/2012 | Leidner ............. G06Q 10/0635 |
| | | | 705/36 R |
| 2014/0278692 | A1 | 9/2014 | Marwah et al. |
| 2015/0046363 | A1* | 2/2015 | McNamara ........ G06Q 10/0635 |
| | | | 705/333 |
| 2018/0349797 | A1 | 12/2018 | Garvey et al. |

OTHER PUBLICATIONS

International Search Report and Written Opinion received in the Application No. PCT/US21/29655, dated Aug. 20, 2021, 10 pages.

* cited by examiner

*Primary Examiner* — Kurtis Gills
(74) *Attorney, Agent, or Firm* — Perkins Coie LLP

(57) ABSTRACT

A system is provided that generates a capacity plan for a resource representing supply to meet demand based on minimizing a cost objective. The system generates demand scenarios by applying a stochastic process that factors in historical information, future goals, and uncertainty in demand. The system generates supply scenarios indicating supply over time for the resource by applying a stochastic process that factors in factors relating to quantity of supply units of the resource and uncertainty in supply. The system identifies a supply scenario that minimizes costs relating to delivery of supply at times other than the times at which supply is need to meet demand based on the demand scenarios. The supply scenario represents the capacity plan.

46 Claims, 12 Drawing Sheets

RESOURCE CAPACITY PLANNING SYSTEM

CROSS-REFERENCE TO RELATED APPLICATION

This application claims the benefit of U.S. Provisional Application No. 63/016,812 filed on Apr. 28, 2020, which is hereby incorporated by reference in its entirety.

BACKGROUND

Cloud data centers throughout the world host millions of servers with many millions of cores (e.g., CPUs). In addition to servers and cores, cloud data centers have a wide range of other types of resources such as GPUs, storage, network bandwidth, floor space, software resources, and so on. Similarly, many companies have private data centers the host similar IT resources. The cloud data centers are provided by various suppliers, such as Azure by Microsoft, AWS by Amazon, and Google Cloud Platform by Google.

A company (or other entity) that uses data center services faces a daunting task in ensuring that the IT resources are available when needed and not before they are needed. If such resources are available before needed, then there is overcapacity. Conversely, if they are not available when needed, there is undercapacity. A company needs to make many decisions to ensure that the appropriate IT resources are available, such as when to purchase IT resources, from whom to purchase IT resources, quantities of IT resources to purchase, and so on. In addition, a company should factor in anticipated demand for the IT resources. The company should factor in the cost of the IT resources and the cost associated with not having sufficient IT resources to meet the demand.

A company also should also consider various uncertainties such as uncertainties in the lead time for delivery of IT resources and in customer demand. For example, a cloud data center may publish a supply catalog of available IT resources. Each catalog item may specify IT resource type, quantity, cost, target lead time, lead time range, and so on. The lead time range represents an uncertainty. Forecasting customer demand is critical but very difficult to do accurately.

DETAILED DESCRIPTION

Figure 1:
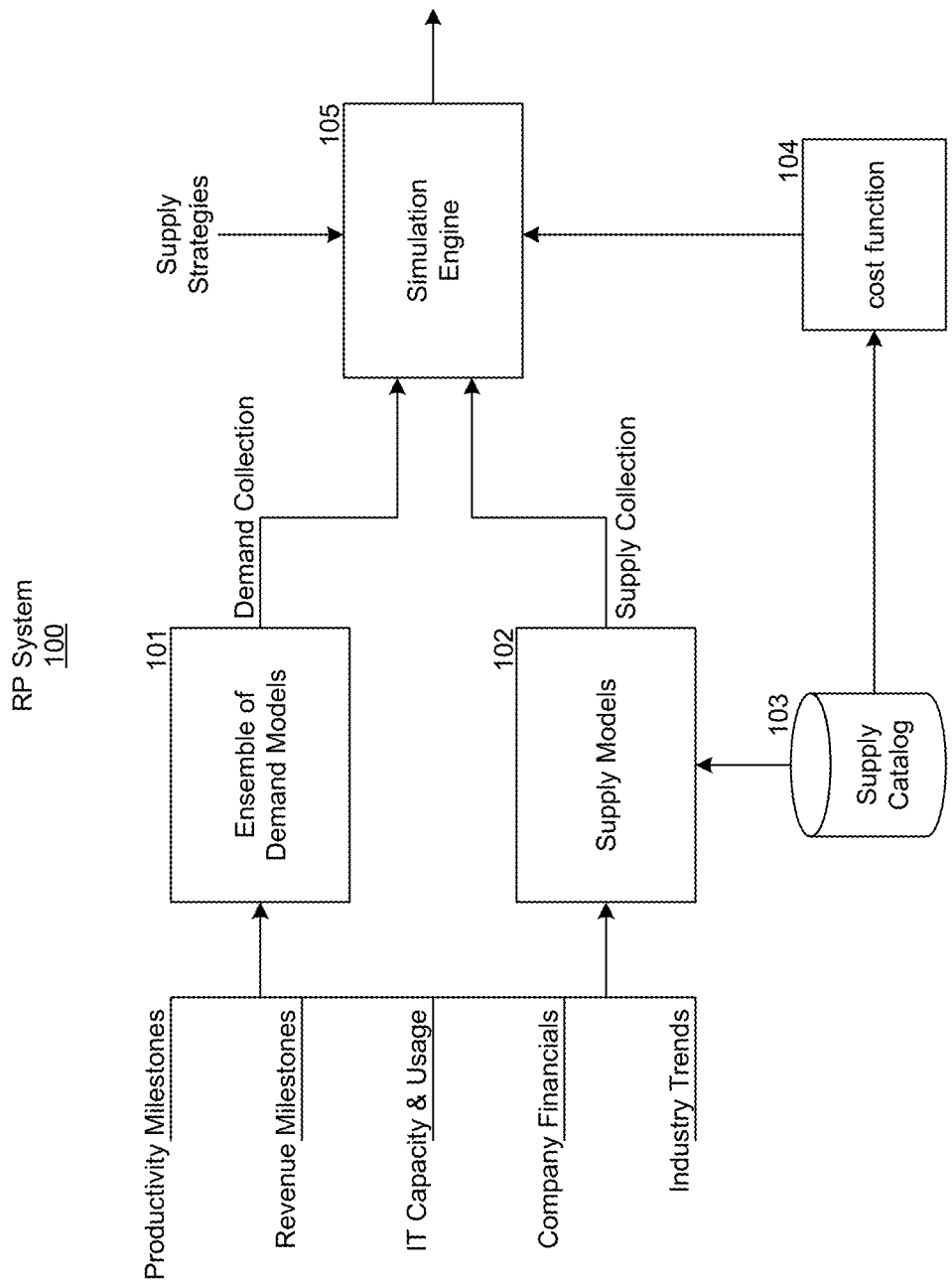
FIG. 1 is a block diagram that illustrates the overall architecture of the RP system in some embodiments.

A method and system for generating a capacity plan for IT resources is provided. In some embodiments, a resource planning (RP) system evaluates future demand for and future supply of an IT resource (e.g., cores) to generate optimal order dates for ordering supplies of the IT resource so that there is sufficient capacity of the IT resource to meet the demand of a company. The RP system may forecast demand based on historical data of the company (e.g., represented by usage) and industries generally (e.g., productivity improvements) and based on milestones set by the company (e.g., target revenue and productivity). The RP system may forecast supply based on uncertainty in lead time, which may, for example, be based on a supplier-provided target lead time and range of lead times (representing uncertainty in the target lead time) for a quantum of the IT resource and confidence that the supplier will meet the target lead time. A quantum of an IT resource represents a quantity of the IT resource that can be ordered as a unit (e.g., 10K cores). The RP system factors in the uncertainty in demand and supply to identify the optimal order dates for units of the IT resource. The uncertainty arises because both the demand on any given date and the delivery date of a unit cannot be forecast with 100% accuracy.

The RP system evaluates different combinations of demand (demand scenarios) and supply (supply scenarios) for dates in a date range (i.e., start date to end date) to identify the combination with the minimum cost as specified by a cost function. The cost function may be customized to the company based on, for example, how the company values overcapacity and undercapacity. Because the computational resources needed to exhaustively evaluate every possible combination of demand and supply may be prohibitively large, the RP system employs probability-based distribution samplings that factor in the uncertainties in demand and supply and evaluates the costs based on those samplings. The RP system may employ various distribution models such as a triangular probability distribution and a Geometric Brownian Motion distribution. The RP system may employ an optimization technique (e.g., gradient descent) to identify the optimal order dates based on minimizing the cost function. The RP system outputs the optimal order dates for each unit to meet the forecasted demand given the forecasted supply. (Terms such as "optimal" and "minimum" refer to the best or lowest value that is calculated by the RP system given a non-exhaustive search for a solution.)

In some embodiments, when generating a capacity plan for an IT resource for a company (or other entity), the RP system optimizes an objective, such as minimizing opportunity loss, when acquiring the IT resource. The RP system factors in uncertainty in demand for and supply of the IT resource. The RP system generates demand forecasts based on historical and future goals for revenue and productivity and generates supply forecasts based on availability and timing of supply. The demand forecast and supply forecast for an IT resource are represented by a demand collection and a supply collection of time series reflecting the forecasted demand for and forecasted supply available on various dates. The demand for each date (e.g., daily or weekly) of a demand collection of demand time series is represented by a distribution of the demand as represented by the values of the demand time series for that date. For example, the demand for January 1 may have values ranging from 50K to 75K cores with each demand time series having a different demand for that date. In such a case, one demand time series may have a value of 60K for January 1, and another demand time series may have a value of 65K for January 1. The supply for each date of the supply collection of supply time series is represented by a distribution of the delivery dates for each order date as represented by the values of the supply time series for that order date. For example, if the order date is January 1 and the lead time is three months, the delivery date associated with January 1 may range from February 15 to April 20. In such a case, one supply time series may have a delivery date of February 28 for an order date of January 1, and another supply time series may have a delivery date of March 19 for an order date of January 1. To generate the capacity plan, the RP system evaluates different combinations of demand and supply of an IT resource to identify a combination that minimizes a cost function based on the objective. The cost function may factor in carrying cost for overcapacity of IT resources and opportunity loss for undercapacity of IT resources. The capacity plan may specify when to place orders for IT resources, when the IT resource will be available for use, the quantity of the order, and so on.

The RP system may generate a demand collection based on one demand forecast model or an ensemble of demand forecast models. Each demand forecast model generates a model-specific demand forecast, which is represented as a model-specific demand collection. When the ensemble is used, the RP system combines the model-specific demand collections (e.g., based on a weighted average) to generate the demand collection. In the following, the RP system is described primarily of using only milestone-based demand model to generate demand forecast that is used as the demand collection. To generate a demand collection, the RP system inputs revenue data and usage data for the company and the industry generally. The RP system calculates productivity from the revenue data and usage data. For example, if a company has $2M in revenue and average usage was 1K cores, the productivity would be $2K per core. The revenue data and usage data include historical data for the company and the industry as a whole and include future goals for the company that are represented as milestones. The future goals may also include efficiency growth milestones for improved productivity. To generate a milestone-based forecast, the RP system generates a revenue collection of collection time series where each time series represents forecasted revenue on a daily basis from an initial date to an end date. Similarly, the RP system generates a productivity collection of productivity time series where each productivity time series represents forecasted productivity on a daily basis from a start date to an end date. The RP system generates the demand collection as the revenue collection divided by the productivity collection. The different demand time series represent the uncertainty in revenue and productivity.

To generate a supply collection, the RP system inputs supply data of IT resources that are available to the company. The supply data is represented as a supply catalog of IT resources that are available from various suppliers and existing supply IT resources of the company. The supply catalog includes supply units (units of purchase) of IT resources, each of which specifies a quantum of an IT resource, target lead time, lead time uncertainty, cost, type of capitalization, and so on. The RP system also inputs a measure of confidence that the company or the industry generally has that a supplier will deliver supply in accordance with the supply catalog. The IT resource of the existing supply may vary over time even without adding additional supply. For example, as a quantity of an IT resource reaches the end of its lifespan, that quantity may need to be decommissioned, resulting in a reduction in the existing supply. The RP system generates a supply collection of supply time series where each supply time series represents forecasted delivery dates for a supply unit, given order dates on a daily basis from a start date to an end date. The different supply time series represent the uncertainty in delivery of the supply.

During evaluation, the RP system may evaluate different possible strategies for purchasing collections of supply units. For example, one strategy may include a supply unit of 10K cores from supplier A with cost A and lead time A; 5K cores from supplier B with cost B and lead time B; and 10K cores from supplier B with cost B' and lead time B'. In the following, the RP system is described first in the context of creating a capacity plan for a strategy with one supply unit.

The RP system evaluates a supply unit to identify an optimal order date for the supply unit, given the demand collection and the supply collection, using an optimization technique (e.g., gradient descent). To identify the optimal order date for a supply unit, the RP system initially creates a demand collection. For each demand time series, the RP system sets the date at which the quantity of the supply unit is needed to the date in which the demand equals the quantity. The RP system also initializes an order date to an initial order date (e.g., start date of the time series) for the supply unit. The RP system then initiates an iterative process of adjusting the order date based on evaluation of the costs associated with ordering the supply unit on order dates until the order date with a minimum cost is identified. During each iteration, the RP system generates a delivery date for each demand time series by sampling a distribution of delivery dates as represented by uncertainty in the delivery date. For each demand time series, the RP system calculates a cost that represents the opportunity loss if the need (or demand) for the quantity for that demand time series is earlier than the delivery date for that time series or represents the carrying cost if the need for that demand time series is later than the delivery date for that demand time series. The RP system calculates an expected cost based on the number of days by which the delivery date is before or after the "need by" date. The RP system calculates the gradient based on change in expected cost from the prior demand collection that was processed. The RP system calculates a date step (positive or negative) to adjust the order date based on the gradient. If the date step is less than a threshold number of days (order dates converge), the optimal order date has been found. Otherwise, the RP system proceeds to the next iteration.

When processing a strategy with multiple supply units, the RP system generates order date collections of order dates with each order date collection having an order date for each supply unit. To generate the order dates for a single order date collection, the RP system employs a stochastic process to determine the optimal order date for each supply unit. For each order date collection, the RP system then calculates a cost associated with that order date collection. To calculate the cost for a single order date collection, the RP system generates a supply time series for the supply collection. To generate a single supply time series, the RP system calculates the supply for each date by aggregating the quantity of the supply units that have a delivery date on or before that date and factoring in decommissioning of existing IT resources. The RP system aggregates the supply for each date, assuming that the supply is available from the delivery date to the end date, to give the capacity of the IT resource for that date. The RP system calculates the cost based on a function of the demand collection and the supply collection. The RP system then selects the supply collection with the lowest cost.

The following tables illustrate an example output of the RP system for a strategy of five supply units of 10K cores each.

|   | Order Date | Delivery Date | % Revenue Captured | Supply | Total Capacity |
|---|---|---|---|---|---|
| 0 | 2020 Jul. 3 | 2020 Oct. 1 | 98.6 | 10K | 80K |
| 1 | 2020 Sep. 13 | 2020 Dec. 12 | 98.2 | 10K | 90K |
| 2 | 2020 Dec. 1 | 2021 Mar. 1 | 99.0 | 10K | 100K |
| 3 | 2021 Feb. 1 | 2021 May 2 | 98.7 | 10K | 110K |
| 4 | 2021 Mar. 23 | 2021 Jun. 21 | 98.5 | 10K | 120K |
| 5 | 2021 May 10 | 2021 Aug. 8 | 98.4 | 10K | 130K |

| quarter | 2020Q1 | 2020Q2 | 2020Q3 | 2020Q4 | Total |
|---|---|---|---|---|---|
| cost | $4,188,912 | $4,188,912 | $4,234,944 | $4,971,456 | $17,584,224 |

The order date represents the optimal order date on which a supply unit of cores should be ordered. The delivery date represents the expected delivery of the supply units, the supply column represents the quantity of the cores in the supply unit, and the total capacity is a running total of the capacity of cores. The costs represent the expected costs for the IT resources on a quarterly basis, given the optimal order dates.

In some embodiments, the RP system employs a set of stochastic demand models to model demand for an IT resource. The stochastic demand models may be based on forward-looking revenue plans and backward-looking historical data. The stochastic demand models may include top-down and/or bottom-up models. Each stochastic demand model outputs a demand collection. The RP system aggregates across each demand with a weighted average, where the weights can be adjusted for model performance.

The RP system employs a supply model to model the supply of IT resources that will be available to the company from various suppliers. The RP system allows a supply catalog to be created that specifies supply units of an IT resource that are available. A supply unit may specify a quantum size, a cost model (e.g., rent or depreciation), a lead time, a lead time uncertainty, and a range of decision points. The supply catalog may also specify dependencies between supply units, such as a supply unit for servers requiring a supply unit for data center space. With such a dependency, a strategy would include supply units for servers and data center space and the cost function would reflect the cost of delivery of servers before availability of a data center space and vice versa.

The RP system employs a cost function to represent the financials of a company based on carrying cost and opportunity loss. The cost function takes in parameters such as risk factor and supply costs of a company. For example, a company can model opportunity loss based on lost revenue or the lifetime value of losing a customer due to insufficient capacity.

The RP system may be used to generate resource plans in environments other than IT resources for a data center. For example, the RP system may be used to generate a resource plan for supply of resources delivered via a supply chain. In the case of an automobile supply chain, the automobile manufacturer may generate an overall resource plan based on demand and supply scenarios for each supplier. The RP system may be employed to generate a resource plan for the manufacturer based on its demand, the supply of direct suppliers, and resource plans for suppliers in the supply chain. The resource plans of the manufacturer and the suppliers may be developed using an optimization technique to identify optimal resource plans for the supply chain. As another example, a software developer or publisher (e.g., a digital or physical game) may employ the RP system to generate resource plans for timing releases of software based on forecasted demand for the software and the supply of the software (e.g., ready to release). Because demand for a software title may decrease over time (e.g., because of interest in a newly released product), the developer or publisher may delay release of a title or speed up development of a title based on costs associated with releasing too early or releasing too late and costs of development. The resource plan may specify release dates for titles, order dates of IT resources need to support those titles, advertising timing, and so on.

Stochastic Demand Models
Milestone-Based Demand Forecast
Milestone-Based Revenue Forecast The RP system includes a milestone revenue forecast (MRF) component that implements a milestone-based revenue forecast model. The MRF component inputs revenue milestones for a company and outputs a revenue forecast that factors in uncertainty in the revenue. Each revenue milestone indicates a goal to reach a target revenue amount at a target revenue date. A revenue milestone also includes a predicted revenue date range (that includes the target revenue date) that indicates the anticipated earliest date and latest date the company thinks the milestone will be reached. The revenue date range reflects a level of uncertainty regarding the target revenue date, with a larger date range representing a higher uncertainty. The following milestone table illustrates example revenue milestones.

| Revenue Milestone Table | | | | |
|---|---|---|---|---|
| Revenue Milestone | Amount | Target | Earliest | Latest |
| 0 | $ 30,000,000 | Jan. 1, 2020 | — | — |
| 1 | $ 60,000,000 | Jan. 1, 2021 | Sep. 1, 2020 | Sep. 1, 2021 |
| 2 | $ 100,000,000 | Jan. 1, 2022 | Jun. 1, 2021 | Jan. 1, 2023 |
| 3 | $ 150,000,000 | Jan. 1, 2023 | Mar. 1, 2022 | Jan. 1, 2024 |

For each revenue milestone, the MRF component samples the dates within the target revenue date range (e.g., earliest date to latest date) based on a probability distribution that may assign the target date the highest probability. For example, the probability distribution may be a triangular probability distribution with the lower limit, mode, and upper limit being the earliest date, target date, and latest date, respectively. The sampled dates represent a possible date that the revenue milestone will be reached. The sampled dates will likely include more dates near the target date and fewer dates near the earliest date and latest date. The MRF component then maps the sampled dates to sampled days representing the number of days from a start date to the sampled date. Referring to revenue milestone 1 of the Revenue Milestone Table, if the initial date is Jan. 1, 2020, a sampled date of Oct. 27, 2020 is mapped to 300 days and Jan. 1, 2021 is mapped to 366 days. The RP system may employ other time periods such as weeks rather than days.

For each sampled date for a revenue milestone, the MRF component calculates the average daily percent growth rate needed to reach the revenue amount by the sampled date. The MRF component calculates the percent growth by increasing from the initial revenue amount on the start date to the revenue amount on the sampled date. The MRF component then calculates the average daily percent growth rate needed to increase to the revenue amount by the sampled date. The average daily percent growth rate is represented by the following equation:

$$x(t)=x(0)*r^t$$

where x is the growth on sampled day t and r is the average daily percent growth rate. For example, if the initial date is Jan. 1, 2020, then the percent growth needed to increase to the revenue amount is 2.0 ($60M/$30M). The MRF component calculates the average daily percent growth $\mu$ (e.g., expected value) and daily volatility $\sigma$ (e.g., variance) based on the sampled dates. The MRF component approximates the daily volatility by dividing the standard deviation of the samples by $t^{1/2}$ where t is the average number of days in the milestone. The MRF component may assume that the daily volatility is the same each day. Thus, the variance is the sum of the variance of each day as represented by the following equation:

$$\sigma_{sample}^2 i*\sigma_t^2.$$

If the sampled day is Oct. 27, 2020, then the average daily growth rate needed to meet the revenue amount of $60M is 1.0023.

For each revenue milestone, the MRF component then generates a revenue collection of time series (revenue time series) that is based on a randomization process such as a Geometric Brownian Motion with an expected value and variance of the average daily growth rate. A revenue time series may be calculated based on the following equation:

$$dS_t=\mu S_t dt+\sigma S_t dW_t$$

where $S_t$ represents the revenue at day t, $\mu$ represent the expected value, $\sigma$ represents standard deviation, and $W_t$ represents Brownian motion.

Each revenue time series indicates revenue amounts for dates from a start date to an end date. To generate a revenue time series, the MRF component sets a revenue amount for the start date to the current revenue (e.g., $30M). For each subsequent date until the end date, the MRF component selects an expected value and variance from those calculated for the revenue milestones based on the prior revenue amount for the prior day. The MRF component selects a revenue milestone with a lowest target revenue amount that is greater than the prior revenue amount. The MRF component generates a revenue growth rate based on a probability distribution (e.g., Gaussian distribution) with the expected value and the variance of the selected milestone. The MRF component then sets the revenue amount for the date to the revenue amount for the prior date multiplied by the expected growth rate. The MRF component then outputs a revenue collection.

Milestone-Based Productivity Forecast

The RP system includes a milestone-based productivity forecast (MPF) component that inputs productivity milestones for a company and outputs a productivity forecast that factors in uncertainty in the amount of and the date of reaching a target productivity improvement. Productivity may be represented as revenue per IT resource. For example, if a company has a revenue of $10M and employs 10K cores, the productivity is $1,000/core (e.g., 10M/10K). A productivity milestone may represent a project of the company that will result in an improvement in productivity when complete. For example, a project may be to rewrite a program so that some of its processing is performed by a GPU. When the project is complete, the company anticipates that the current productivity of $1,000/core will increase to $1,100/core, corresponding to a 10% improvement in productivity. Each productivity milestone includes a target productivity improvement and a productivity improvement range. The productivity improvement range indicates a low improvement and high improvement that bounds the productivity improvement that could be attained. The productivity improvement range reflects a level of uncertainty in the amount of productivity improvement that will be attained, with a wider range representing a greater uncertainty. A productivity milestone also includes a target improvement and a productivity date range that indicates the earliest date and latest date at which the productivity improvement will be attained. The productivity date range reflects a level of uncertainty in the date (e.g., project completion) at which the productivity improvement will be attained, with a wider productivity date range representing a greater uncertainty. The following table illustrates example productivity milestones.

| Productivity Milestone Table | | | | | | |
|---|---|---|---|---|---|---|
| Productivity Milestone | Improvement | Low | High | Target | Early | Late |
| 1 | 10% | 0% | 20% | Jan. 1, 2021 | Sep. 1, 2020 | Mar. 1, 2021 |
| 2 | 5% | 2% | 7% | Mar. 1, 2021 | Oct. 1, 2020 | Apr. 1, 2021 |

The MPF component outputs a productivity collection of productivity time series. Each productivity time series covers a time period starting with a start date. A productivity time series represents the amount and timing of a productivity improvement, given the uncertainty in the productivity date range. For example, if the start date is Jan. 1, 2020 and the time period is two years, then the MPF component will generate a time series of 731 days. Because of the uncertainty, productivity milestone 1 may have a productivity improvement of 11% that is attained on Feb. 1, 2021, and productivity milestone 2 may have a productivity improvement of 4% that is attained on Dec. 1, 2020. In such a case, the productivity time series will have an initial productivity for the days until Dec. 1, 2020, a second productivity of 1.04 times the initial productivity from Dec. 1, 2020 until Feb. 1, 2021, and a third productivity of 1.11 times the second productivity from Feb. 1, 2021 until Dec. 31, 2021.

To generate the productivity time series, the MPF component samples productivity improvements within the productivity improvement range and samples productivity improvement dates within the productivity date range using a probability distribution. The probability distribution for productivity improvements may be a triangular distribution with the lower limit, mode, and upper limit corresponding to the low, target, and high productivity improvements, respectively. The probability distribution for the productivity improvement dates may also be a triangular distribution with the lower limit, mode, and upper limit corresponding to the early, target, and high productivity improvement dates, respectively. The following table provides four samples of productivity improvements and productivity improvement dates for productivity milestones 1 and 2.

| Productivity Improvement Table | | |
|---|---|---|
| Milestone 1 | Productivity Improvements | [10, 5, 15, 11] |
| | Attainment Dates | [Dec. 15, 2020, Jan. 7, 2021, Oct. 25, 2020, Feb. 1, 2021] |
| Milestone 2 | Productivity Improvements | [3, 5, 6, 4] |
| | Attainment Dates | [Feb. 21, 2021, Mar. 15, 2021, Nov. 9, 2020, Dec. 1, 2020] |

For the third sample, milestone 1 has values of 15 and Oct. 25, 2020, and milestone 2 has values of 6 and Nov 9, 2020. The MPF component generates a productivity time series for each sample.

The MPF component generates the demand collection of time series with each demand time series based on a revenue time series divided by a productivity time series.

Technology Adoption Demand Forecast

The RP system may include a technology adoption demand (TAD) component that employs technology trends to generate a demand collection based on a revenue collection and a productivity collection. The TAD component may train a machine learning algorithm (e.g., a neural network) that inputs a series of revenue growth rates (e.g., year-over-year increases in revenue) and outputs a probability distribution for the projected revenue growth rate for the following year. To train the machine learning algorithm, the TAD component creates training data that includes feature vectors of revenue growth rates labeled with a revenue growth rate derived from historical industry data. The revenue growth rates of a feature vector may represent a sequence of annual revenue growth rates of a company, and the label may represent the annual revenue growth rate of the following year. The following table illustrates revenue growth rates over 5 years for a company.

| Industry Revenue Growth Rate Table | | | | |
|---|---|---|---|---|
| Year | Country | Technology | Production | Y/Y |
| 1990 | United States | Computer | 54400000 | 8.5% |
| 1991 | United States | Computer | 59100000 | 8.6% |
| 1992 | United States | Computer | 64500000 | 9.1% |

-continued

| Industry Revenue Growth Rate Table | | | | |
|---|---|---|---|---|
| Year | Country | Technology | Production | Y/Y |
| 1993 | United States | Computer | 70200000 | 8.8% |
| 1994 | United States | Computer | 77000000 | 9.7% |

The training data may include a feature vector of [8.5, 8.6], which are the growth rates in 1990 and 1991. The feature vector would be labeled with 9.1, which is the growth rate for 1992. Another feature vector may be [9.1, 8.8], which are the growth rates of 1992 and 1993, labeled with 9.7, which is the growth rate for 1994. The cost function used when training the machine learning algorithm uses the mean and standard deviation output by the machine learning algorithm to generate a log likelihood that a labeled feature vector is in the predicted Gaussian. After training, the TAD component employs the machine learning algorithm to generate a projected revenue growth rate for the next year for a company, given its growth rates in the most recent years. The following table illustrates growth rates for the company.

| Company Revenue Growth Rate Table | | |
|---|---|---|
| Date | Revenue | Y/Y |
| 2018 | 150000000 | 13% |
| 2019 | 168000000 | 12% |

The TAD component inputs the feature vector [13, 12] to the machine learning algorithm, which returns the mean and standard deviation of the projected revenue growth rate for 2020.

The TAD component generates a revenue collection of a revenue time series of daily revenue. The TAD component calculates projected revenue at the end date for the company as the revenue at the start date times the sampled projected revenue growth rate. The TAD component samples the projected revenue growth based on a Geometric Brownian Motion algorithm using the mean and standard deviation.

To generate the productivity collection of time series, the TAD component calculates from historical industry data the productivity gains that occur when the revenue of a company doubles. For example, a company may have a revenue of $1M and $2M and IT resources of 1K cores and 1.5K cores in years 1 and 2. Since productivity is revenue divided by IT resources, the productivity gain is 33% (i.e., 2M/1.5–1M/1K).

To generate a productivity time series, the TAD component samples the productivity gains of a company based on a probability distribution. For example, the probability distribution may be a triangular distribution with the lower limit, mode, and upper limit corresponding to lowest, average, and highest productivity gains, respectively. The TAD component generates a productivity time series by interpolating the sampled productivity gains into daily values.

The TAD component then generates an IT resource demand collection by dividing the revenue time series by the productivity time series.

Usage-Based Regression Demand Forecast

The RP system includes a usage-based regression forecast (URF) component to generate a demand collection of demand time series based on historical usage of IT resources. Utilization is a measure derived from usage that refers to the quantity of an IT resource used during a time period divided by the capacity of the IT resource. For example, the utilization refers to the number of core-hours used during a time period divided by the total number of core-hours available to be used during the time period. The following table is an example of the usage of the company.

Company Usage Table

| Year | Resource | Capacity | Consumption | Peak Utilization |
|---|---|---|---|---|
| 2018 | Cores | 10000 | 4500 | 90% |
| 2019 | Cores | 10000 | 5000 | 95% |

In 2018, the company had 10K cores and an average consumption (or usage) of 4.5K cores, representing average consumption of 45% of the available cores. The peak utilization represents the maximum number of cores consumed at a time. Thus, in 2018, the company had a peak utilization of 90%, representing a peak consumption of 9K cores. The URF component learns regression models based on historical usage of the company. The regression models may be generated, for example, using Facebook Prophet. The URF component learns different regression models based on different parameters, such as Fourier order, type of growth (e.g., linear or logistic), and seasonality. The regression models may be based on a usage ratio of peak usage to average consumption. Referring to the Company Usage Table, the ratio for 2018 would be 2.0 (90%/45%). A regression model may input a day of the year and output a sample of usage for that day. The URF component may initialize a demand time series, sample the usage ratio, and adjust the demand time series based on the usage ratio. For example, the URF component may initialize the demand time series to a demand of 4.5K cores (10K*50%), generate a sample ratio of 2.0, and adjust the demand time series to give a demand of 9K (2.0*4.5K). The factoring in of usage helps ensure that there is capacity to meet peak demand without having overcapacity, given the cost function.

Usage-Based Neural Network Demand Forecast

The RP system includes a usage-based neural network (UNF) component, similar to the URF component, that generates a demand collection of demand times series for IT resources factoring in usage. The usages are sampled, however, using a neural network. The UNF component trains the neural network using historical usage data of the company. The UNF component may employ a cost function that is based on a log-likelihood when training the neural network. The neural network outputs a mean and a variance of a Gaussian. To train the neural network, the UNF component splits the usage data into training data, cross-validation data, and test data so that the neural network does not overfit. A feature vector represents a sequence of usages labeled with a sequence of the following usages. For example, if each usage is for a day, the usages of a feature vector may be for days [1 2 3 4] labeled with usages for days [5 6 7 8] and a feature vector may be for days [2 3 4 5] labeled with usages for days [6 7 8 9]. The URF component employs the neural network to sample usages when generating the demand collection of demand time series.

Project-Based Demand Forecast

The RP system includes a project-based demand forecast (PDF) component that generates a demand collection for one or more IT projects. The PDF component defines models for various project types. The models may be standard models or models customized to a company. The models may factor in various characteristics of the projects, such as IT resource limits, expected growth rate of IT resources, project stages, project completion dates, and so on. The characteristics represent parameters for the models.

Separate models may be defined for project types such as e-commerce, the internet of things, social media, blockchain mining, and so on. The model for a project type is defined to account for the different demands on IT resources by projects of that type. For example, social media projects may be considered to be storage-intensive (requiring a large amount of storage), blockchain mining projects may be considered to be compute-intensive (requiring a large number of cores and GPUs), and e-commerce projects may be considered to require a balanced amount of storage resources and compute resources.

An IT resource limit parameter may indicate the maximum amount of an IT resource that can be consumed by the project. For example, the IT resource limit may be 1K cores or 100TB storage. The expected growth rate parameter may indicate the growth rates for storage, cores, and so on. The project stage parameter may indicate that the project is in development or in production. The project completion date indicates a target completion date, an early completion date, and a late completion date. Some of the parameters are associated with an uncertainty that is taken into account when generating the time series.

A model defines weights that are based on parameters. For example, the model may have a weight for storage and a weight for compute. If the project is a blockchain mining project that is in development, both weights may be set to a medium value. If that project is in production, the storage weight may be set to a low value and the compute weight may be set to a high value.

For each project, the PDF component generates a demand collection of demand time series for an IT resource using the models for the project type to sample the IT resource demands factoring in a distribution that is based on the uncertainties. For each sample, the PDF component generates a demand time series.

Stochastic Supply Forecast Model

The RP system includes a stochastic supply forecast (SSF) component that generates a supply collection of supply time series representing the supply of an IT resource. The SSF component inputs a supply catalog that includes supply units of the IT resource. Each supply unit specifies an IT resource (e.g., core) and quantity (e.g., 1K cores), an asset (e.g., servers that hold the cores), a cost model (e.g., rent, depreciation, or option), a lead time (e.g., 3 months), a lead time uncertainty (e.g., 2 weeks), and a range of order dates for future analysis. The supply catalog may represent the supply available from different suppliers, such as data centers, manufacturers, and so on. The following table illustrates an example supply unit of a supply catalog.

| Supply catalog | Sku name | Asset | Cost model | IT Resource | Units | Lead Time | LT Uncertainty | Cost |
|---|---|---|---|---|---|---|---|---|
| 1 | Compute Server | Server | Capital exp. | Cores | 10K | 3 | 1 | $6M |

The supply catalog may specify dependencies of IT resources such as a quantity of servers requiring an amount of data center space. For example, regardless of the lead time for a supply unit of servers, the servers will not be available until enough data center space is available.

The SSF component factors in the confidence of a company regarding how likely it is that a supplier in a region will be able to deliver a supply on time. For example, a company may have a 95% confidence that one supplier will deliver on time and an 80% confidence that another supplier will deliver on time. The SSF component may also factor in the confidence that other companies have in a supplier. The confidence of other companies may be expressed by an array with a value for each company such as [0.90, 0.95, 0.99, 0.875] for four companies.

The SSF component may also factor in a confidence derived from social media. The SSF component collects text content, including social media content such as text posts (e.g., Twitter) and news content such as headlines from news articles (e.g., "Data Center X at Capacity"). The SSF component creates a feature vector for each text content that contains the text. The SSF component labels each feature vector based on its meaning, such as capacity shortage or no capacity shortage for a data center. The feature vector may be manually labeled. The SSF component trains a content-shortage classifier (e.g., a support vector machine or a neural network) using the feature vectors and labels the training data. The content-shortage classifier may be a binary classifier. The content-shortage classifier inputs text content and outputs whether the text content represents no capacity shortage or a capacity shortage.

The SSF component employs a content-supplier classifier that inputs text content and outputs a supplier in a region, such as Company X in Country Y, that is the subject of the text content. The SSF component trains the content-supplier classifier (e.g., a neural network) using training data that includes feature vectors of text content with labels identifying a supplier in a region. The feature vectors may be manually labeled. The SSF component employs the text content-supplier classifier to identify the supplier in a region associated with newly collected text content that the content-shortage classifier classifies as associated with a capacity shortage. The content-supplier classifier may be a categorical classifier.

The SSF component may collect new text content on a daily basis and employ the content-shortage classifier and the content-supplier catalog to identify suppliers in regions having a capacity shortage. The SSF component identifies statistically significant differences in capacity shortage for a supplier in a region on a daily basis based on prior capacity shortages. For example, if on a given day a supplier in a region has 50 instances of text contents that indicate a capacity shortage but the average over the last 30 days was 10 instances, then the SSF component identifies the day as statistically significant. The SSF component may determine the confidence for a supplier in a region to be the percentage of days over the last year identified as statistically significant.

The SSF component then generates a supply delay model that represents a distribution of delays in fulfillment based on a weighting of the different types of confidence. The weights may be supplied by a customer. For example, a customer who has little experience with data centers may assign a low weight to its confidence in those centers. The SSF component generates a weighted confidence for each supplier in a region. To generate the supply delay model, the SSF component samples numbers from a uniform distribution between 0 and 1. If the sampled number is less than the weighted confidence, the SSF component adds a 0 days delay sample to the distribution. If the sampled number is greater than the weighted confidence, the SSF component calculates the days of delay based on a supplier delay constant (e.g., 30 days). The SSF component may assume that sampled numbers greater than the weighted confidence have delays that vary linearly from 0 days at the weighted confidence to the supplier delay constant at a confidence of 1. The SSF component adds the days of delay associated with that sample confidence to the distribution. The supplier delay constant for a supplier and region may be manually supplied based on the lead times of that supplier in that region.

To generate a supply collection of time series, the SSF component, for each date as an order date, samples the distribution for the delay in delivery from that order date. The SSF component sets each delivery date for each date in the time series to that date plus the sampled delay.

Cost Function

The RP system includes a cost function component that implements a cost function that generates a cost that is the sum of a carrying cost and opportunity loss. The cost function parameterizes risk factors of a company and its supply costs. For example, for opportunity loss, a parameter may be that a customer wants to represent opportunity loss as the revenue lost due to insufficient IT resources or as the lifetime value of its customers lost due to insufficient IT resources. For carrying cost, the parameters are defined by the supply catalog of supply options available to the company. The RF system seeks to minimize the cost function when generating strategies to satisfy the IT resource demand of a customer. Rather than providing parameters to a standard cost function, a company may provide its own cost function that is differentiable. A cost function factor may factor in terms of sale such as final sale or rent and tax implications.

Figure 3:
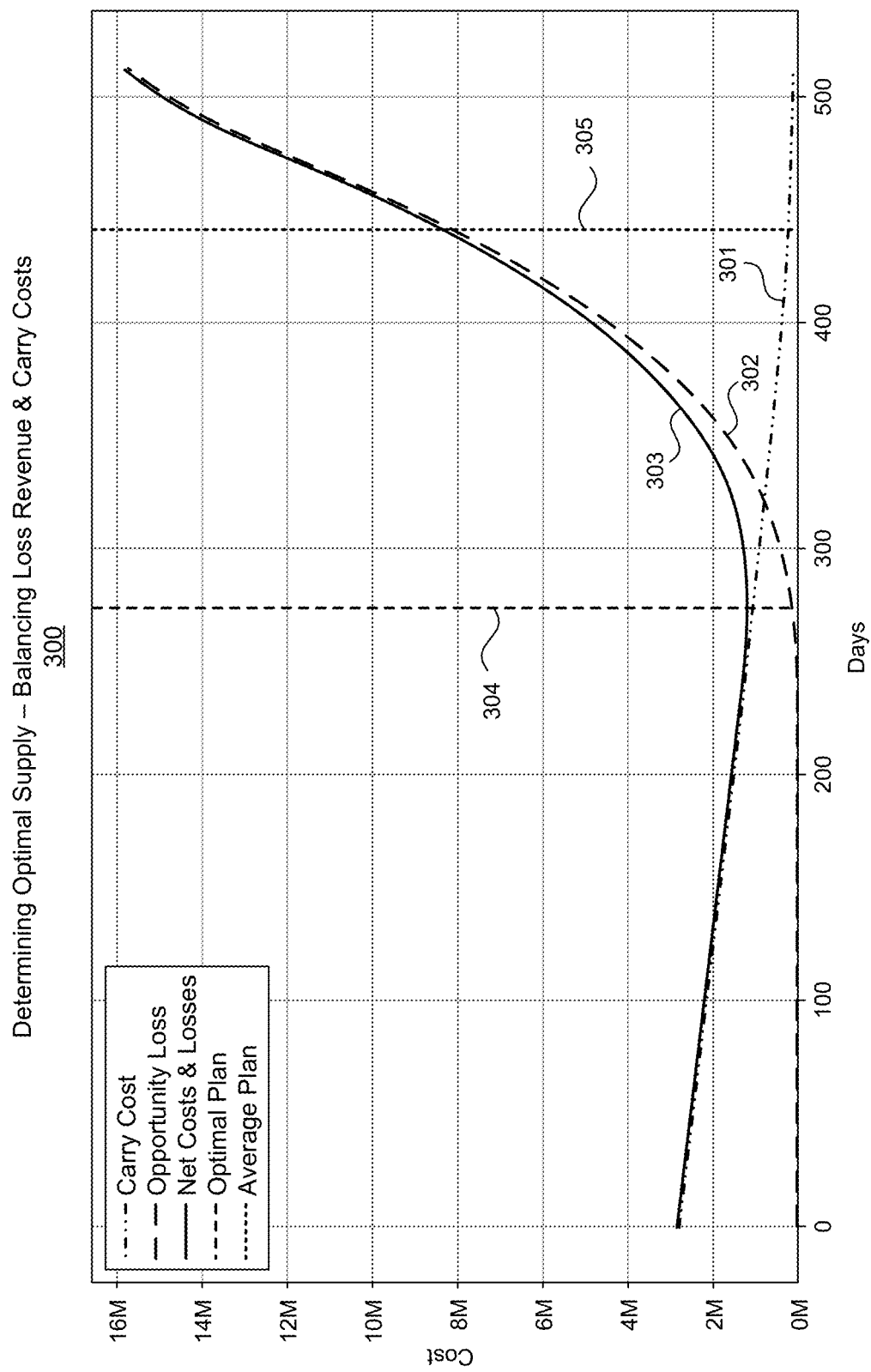
FIG. 3 is a graph that represents the costs associated with a given capacity of cores.

FIG. 3 is a graph that represents the costs associated with a given capacity of cores. The graph 300 illustrates carrying cost, opportunity loss, and net cost on a daily basis with the capacity of cores. The line 301 represents carrying cost (overcapacity). The line 302 represent opportunity loss (undercapacity). The line 303 represents net cost. The line 304 represents the day on which the cost is at the minimum. The line 305 represents the day on which the cost is equal to the average of the daily costs. The days before the green dashed line represent where the capacity exceeds demand, indicated by no opportunity loss. The day at the green dashed line represents where capacity equals demand. The days after the green dashed line represent where demand exceeds capacity, indicated by an increasing opportunity loss.

The carrying cost is the cost associated with having an underutilized IT resource and may be calculated by a carrying cost function as represented by the following equation:

$$CC = UC * \Sigma(\max(0, C(t) - D(t))) \text{ for all } t$$

where CC represents carrying cost, UC represents unit cost, C represents IT resource capacity, D represents IT resource demand, and t represents day. However, more complex carrying cost functions, may factor in various parameters. The parameters may relate to capitalization of the IT resource. The parameters may include the weighted cost of capital, which would change the unit cost to interest on capital expense as opposed to rent or depreciation cost. The parameters also may include when depreciation starts, such as when delivered or utilized, which adds an offset to the IT resource capacity and IT resource demand comparison. Another parameter may be whether to discount future costs against net present value.

The opportunity loss represents the costs associated with not being able to serve demand and may be calculated by an opportunity loss function as represented by the following equation:

$$OL=P*\Sigma(\max(0,D(t)-C(t))) \text{ for all } t$$

where OL represents opportunity loss and P represents productivity. However, more complex carrying cost functions, may factor in various parameters. The parameters may include estimated number of customers turned away from an average order size. The loss for a customer is the product of productivity, average order size, and average retention. Another parameter may indicate the percent at which demand can exceed capacity without being considered an opportunity loss. Another parameter may be a multiplier on the opportunity loss because of an opportunity being lost to a competitor.

Sensitivities

The RP system includes a sensitivity evaluation (SE) component to assist in evaluating the impact of various factors on a capacity plan. For example, by increasing opportunity loss, the overall cost of a capacity plan may increase. As another example, by increasing the confidence that a supplier will deliver by the target date, the overall cost of the capacity plan may decrease. Also, by increasing the uncertainty in reaching a milestone, the overall cost of the capacity plan may increase.

The SE component allows for factors to be modified either individually or in combination and then directs the creation of new capacity plans based on designated factors. For example, the SE component may automatically modify a designated factor (e.g., in increments of +/10%) and create different capacity plans. If a capacity plan was generated based on four factors having values (A, B, C, D) to determine the sensitivity of each factor, capacity plans would be generated with values (A', B, C, D), (A", B, C, D) . . . (A, B', C, D'), (A, B", C, D) . . . (A, B, C', D), (A, B, C", D) . . . (A, B, C, D'), (A, B, C, D"), and so on, where A' and A" represent modified values for factor A. In addition, the SE component may also evaluate the capacity plans to highlight the differences such as in overall cost, opportunity loss, and so on. When the factors are evaluated individually, the SE component presents an analysis of the costs and risks of each so that a business decision can be made as to capacity plan that is most appropriate for the company.

Capacity Plan Adjustments

The RP system includes a capacity plan adjustments (CPA) component that generates new capacity plans over time based on changed factors and evaluates the impact creates and implements a capacity plan that covers two years, the company may create a new capacity plan on July 1 using a changed factor. To evaluate the impact of the changed factors on the new capacity plan, the CPA component may generate a capacity plan based on changing that factor and not changing the other factors. For example, if a capacity plan was generated based on four factors having values (A, B, C, D), then to determine the impact of each factor, capacity plans would be generated with values (A', B, C, D), (A', B', C, D), (A', B', C', D), and (A', B', C', D'). This allows for analysis of the cumulative impact of a sequence of adjustments.

FIG. 1 is a block diagram that illustrates the overall architecture of the RP system in some embodiments. The RP system 100 includes an ensemble of demand models component 101, a supply models component 102, a supply catalog 103, a cost function 104, and a simulation engine 105. The components 101 and 102 receive inputs relating to productivity milestones, revenue milestones, IT capacity and usage, company financials, and industry trends. The ensemble of demand models component 101 employs various stochastic models, each of which generates a demand collection and combines those demand collections to generate and output a demand collection. The supply models component 102 additionally inputs the supply catalog 103 and outputs a supply collection. The simulation engine 105 inputs the demand collection and supply collection, accesses the cost function 104, and outputs a capacity plan.

The computing systems (e.g., nodes) on which the RP system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, high-performance computing systems, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the RP system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The RP system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the RP system may be implemented in hardware using, for example, an application-specific integrated circuit (ASIC) or field programmable gate array (FPGA).

Figure 2:
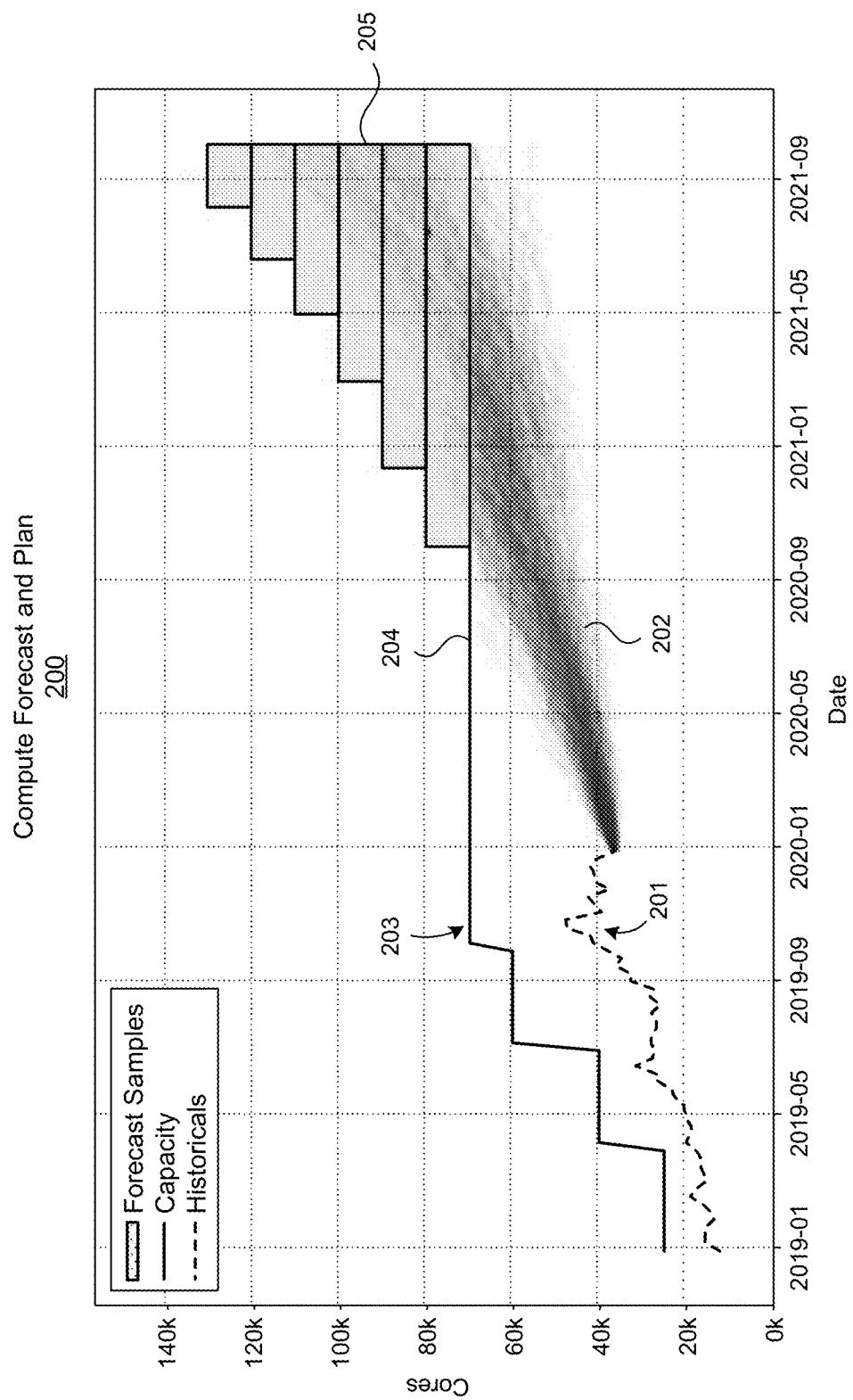
FIG. 2 is a graph that illustrates a capacity plan in some embodiments.

FIG. 2 is a graph that illustrates a capacity plan in some embodiments. The graph 200 illustrates historical capacity, forecasted demand, and capacity of the capacity plan. The black dashed line 201 represents historical demand for cores prior to January 2020. The blue lines 202 represent a demand collection with each separate blue line representing a demand time series. The green line 203 before January 2020 represents historical capacity of cores. The green line 204 after January 2020 and the green area 205 represent the capacity plan. The start date for the capacity plan is Jan. 1, 2020, and the end date is Oct. 1, 2020. The green line represents no increase in capacity from the current capacity.

The green area represents recommendations to add capacity (i.e., supply unit of 10K cores) on Sep. 25, 2020, Dec. 15, 2020, and so on.

Figure 4:
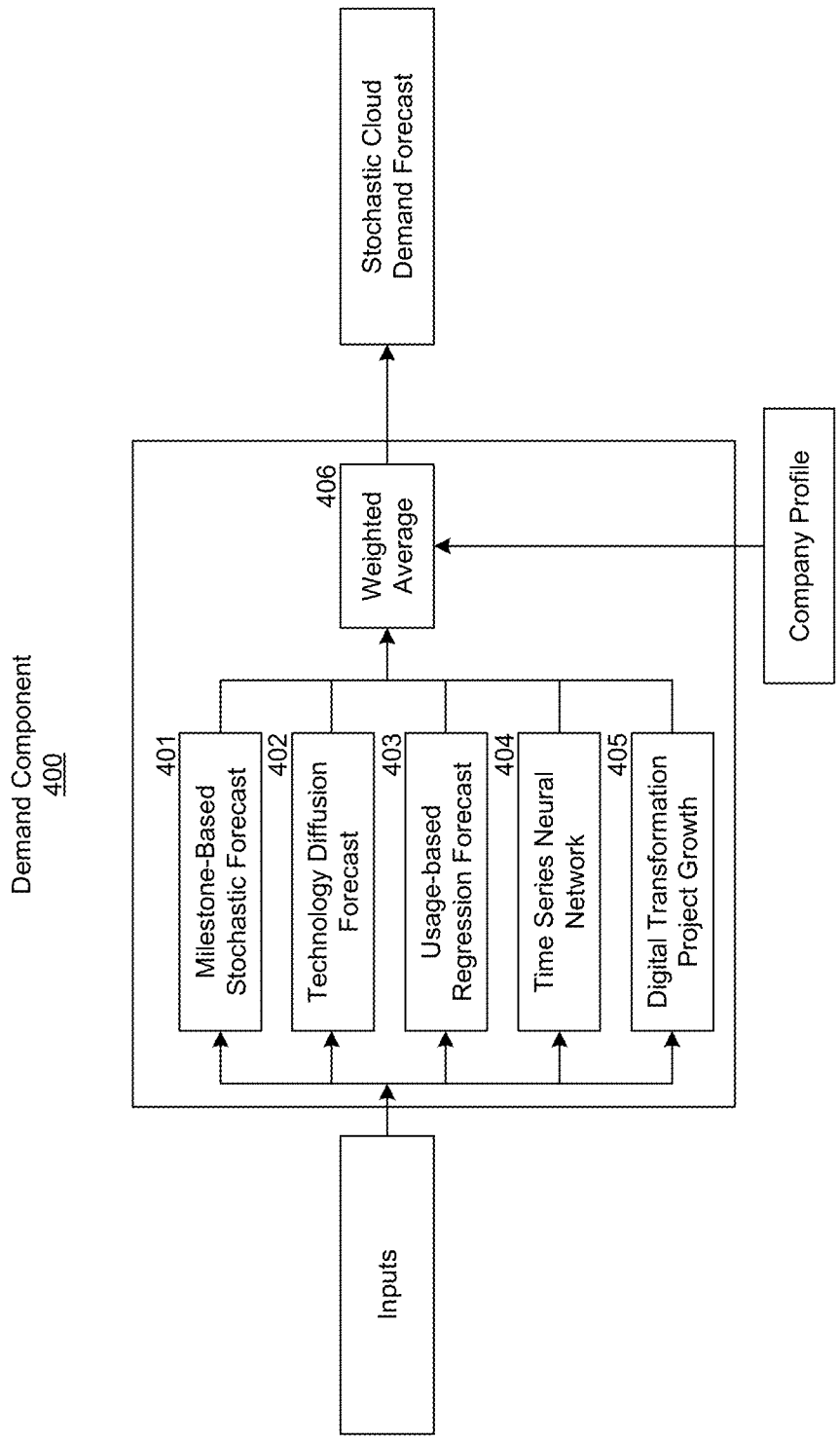
FIG. 4 is a block diagram that illustrates components of the demand component that generates the demand collections in some embodiments.

FIG. 4 is a block diagram that illustrates components of the demand component that generates the demand collections. The demand component 400 includes an ensemble of forecasting components that include a milestone-based stochastic forecast component 401, a technology diffusion forecast component 402, a usage-based regression forecast component 403, a time series neural network component 404, and a digital transformation project growth (i.e., technology adoption) component 405. Each component generates based on its inputs and outputs a demand collection of demand time series. The weighted average component 406 inputs the demand collections and outputs a weighted combination of the demand collections as the demand forecast.

Figure 5:
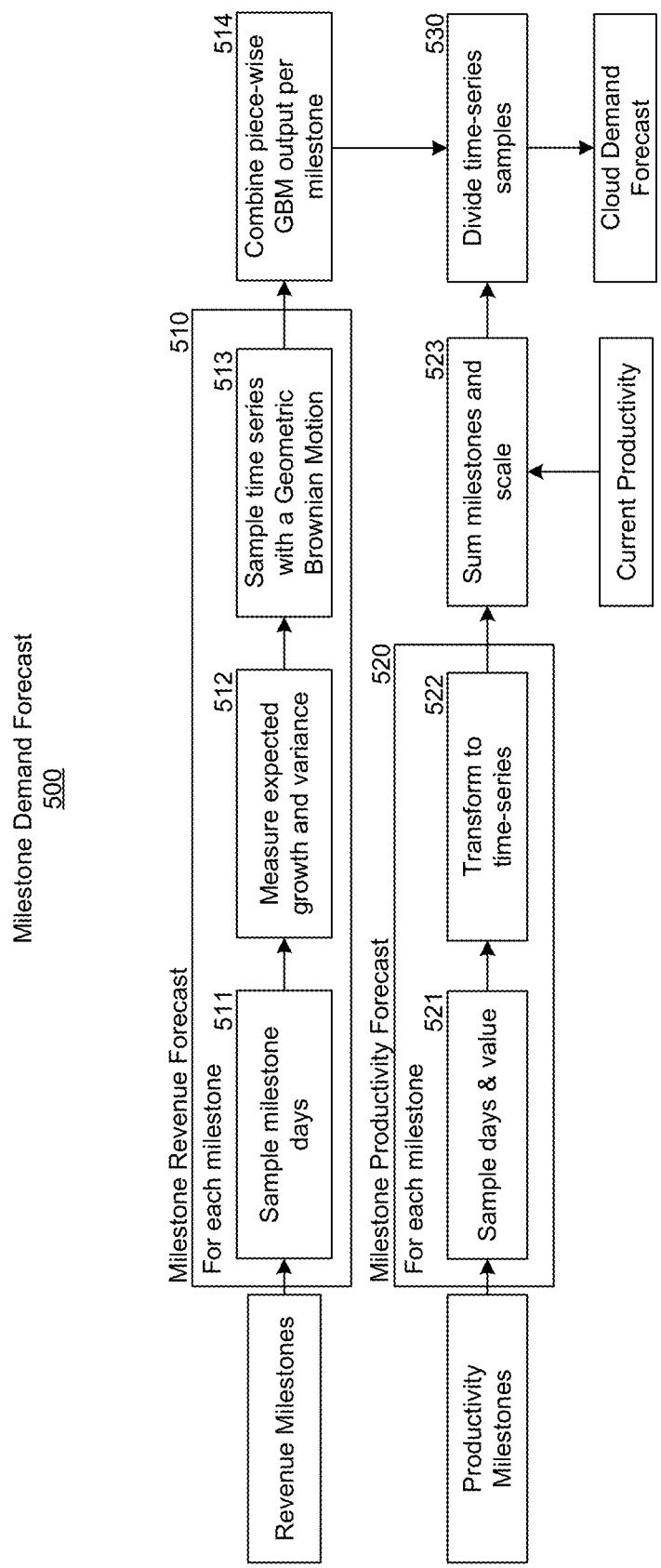
FIG. 5 is a block diagram that illustrates components of the milestone demand forecast component in some embodiments.

FIG. 5 is a block diagram that illustrates components of the milestone demand forecast component. The milestone demand forecast component 500 includes a milestone revenue forecast component 510, and a milestone productivity forecast component 520. The MRF component, for each milestone, samples 511 the milestone days, measures 512 the expected growth and variance of the sampled distribution, and samples 513 the distribution to generate revenue time series based on the distribution. The revenue time series are then combine 514 piece-wise the Geometric Browning Motion output per milestone. The MRF component then combines the revenue time series to generate a revenue collection of revenue time series. The MPF component, for each milestone, samples 521 the days and values and transforms 522 the samples into time series. The milestones are then summed 523 to generate the productivity collection of time series. The revenue collection is then divided by 530 the productivity collection to generate the demand collection.

Figure 6:
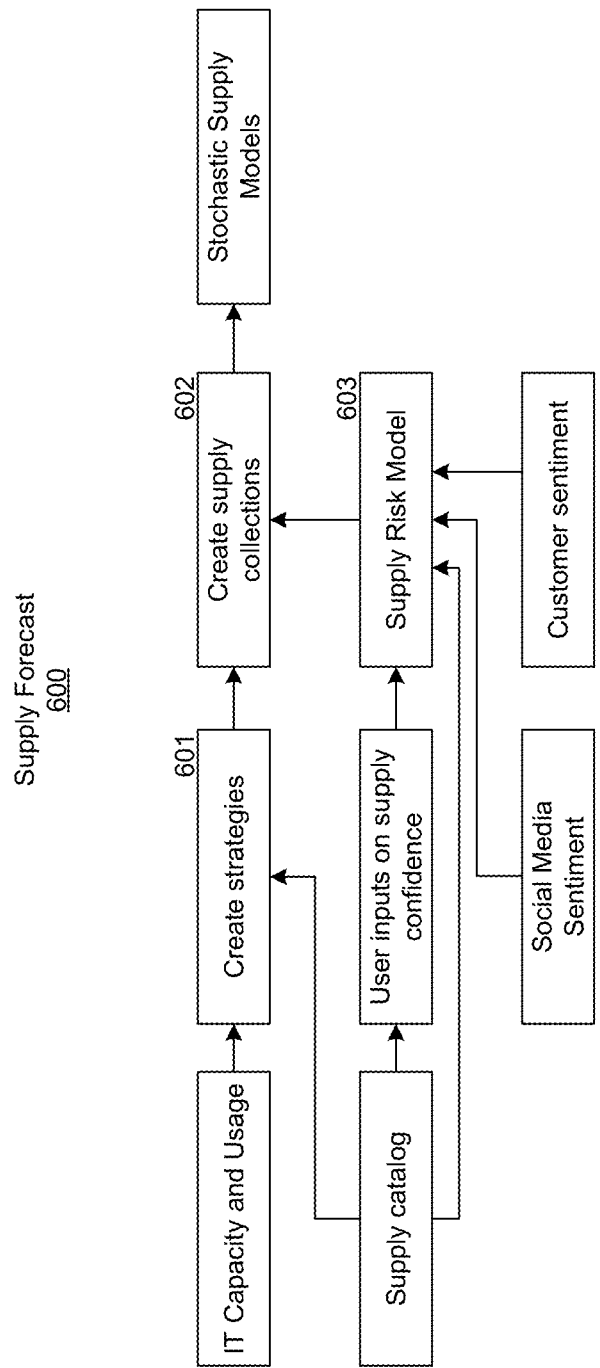
FIG. 6 is a block diagram that illustrates components of the supply forecast component in some embodiments.

FIG. 6 is a block diagram that illustrates components of the supply forecast component. The supply forecast component 600 includes a create strategies component 601, a create supply collections component 602, and a supply risk model component 603. The supply forecast component inputs IT capacity and usage information, a supply catalog, social media sentiment, customer sentiment, and supply confidence and outputs a supply collection of supply time series. The create strategies component may receive input on what supply units to include in a strategy or may automatically select different combinations of supply units based on anticipated demand, and the create supply collections component creates the supply collection for a strategy.

Figure 7:
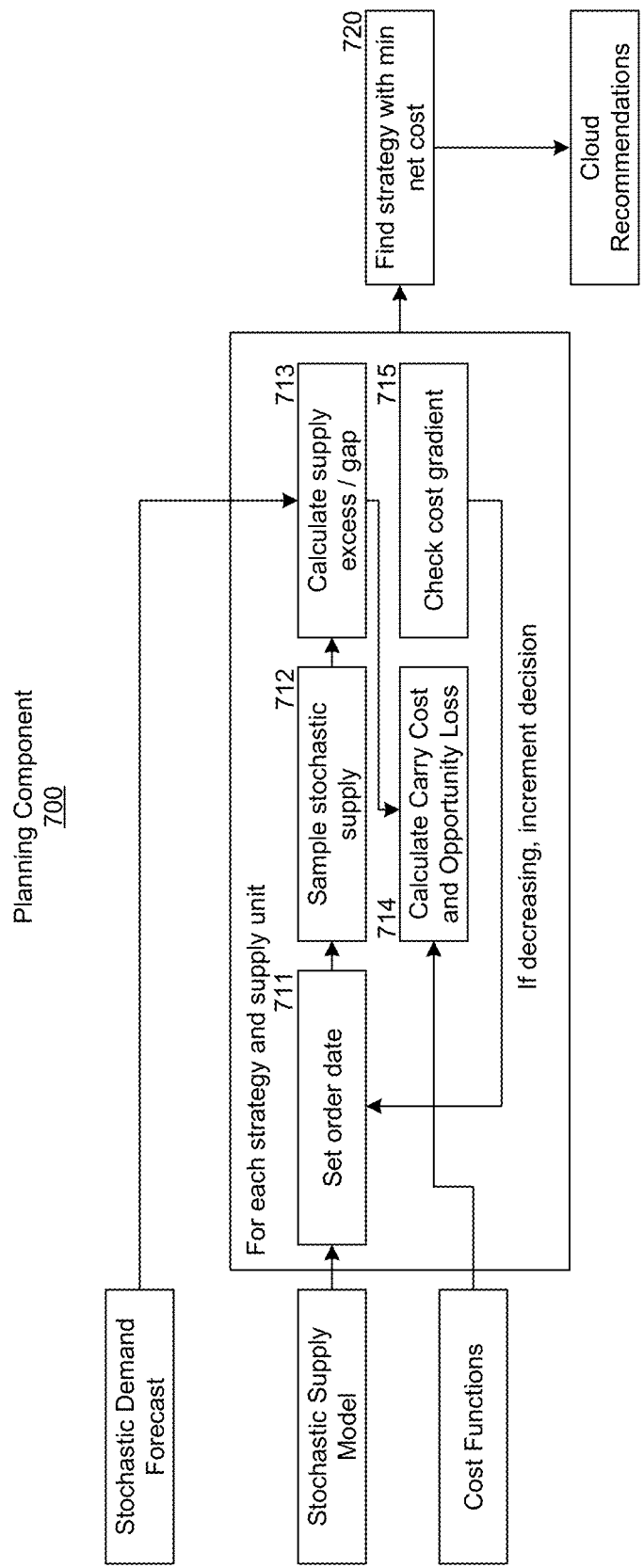
FIG. 7 is a block diagram that illustrates components of a planning component in some embodiments.

FIG. 7 is a block diagram that illustrates components of a planning component. The planning component 700, for each strategy and supply unit, sets 711 the order date, samples 712 the supply collection for the associated delivery dates, calculates 713 the difference between supply and demand, calculates 714 the cost, and adjusts 715 the order date based on the gradient of the cost. The planning component then selects 720 the strategy with the minimum net cost as the recommended capacity plan.

Figure 8:
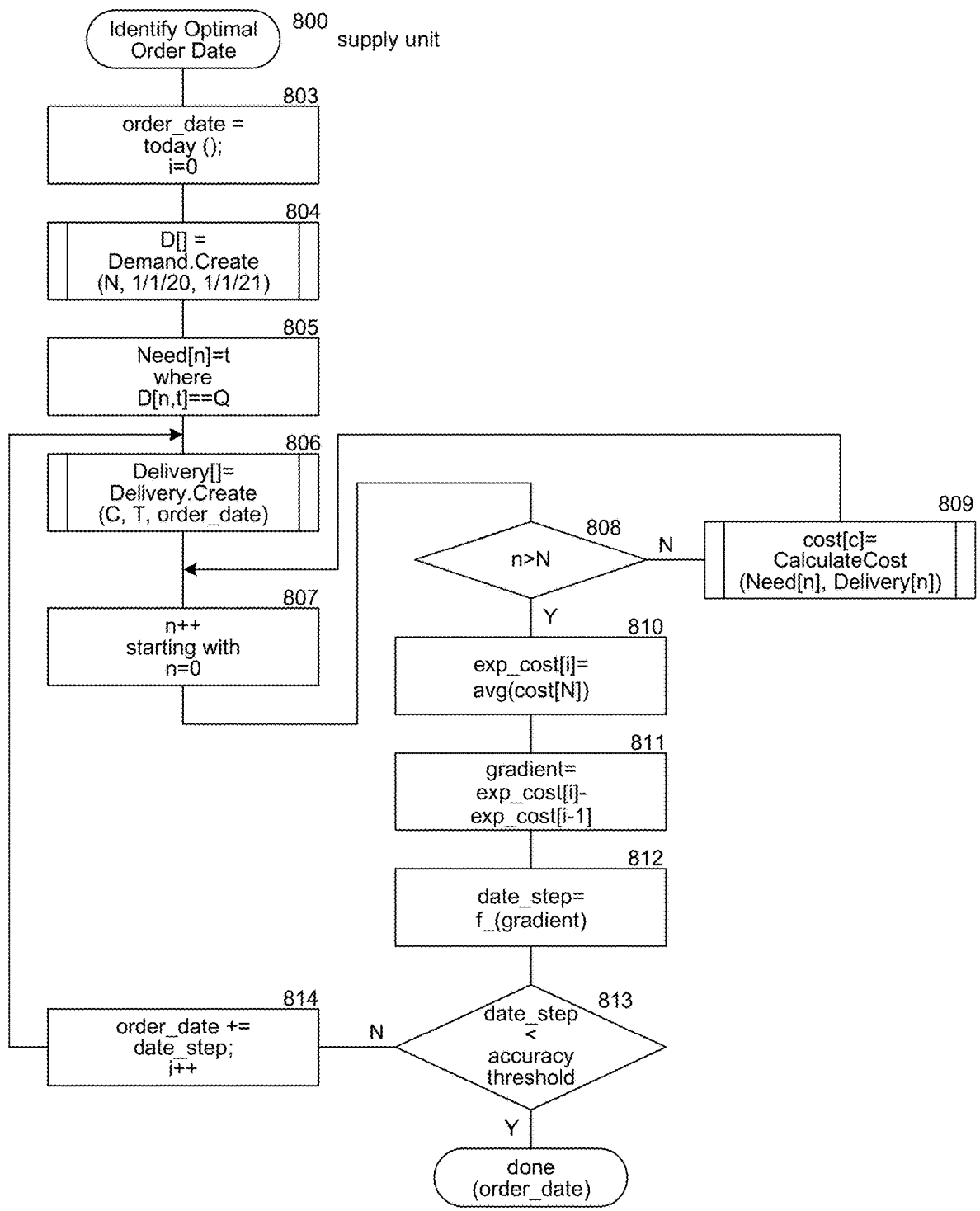
FIG. 8 is a flow diagram that illustrates processing of an identify optimal order date component in some embodiments.

FIG. 8 is a flow diagram that illustrates processing of an identify optimal order date component. The identify optimal order date component 800 determines the optimal order date for a supply unit. In block 803, the component sets the order date to a start date and initializes an iteration counter for the loop represented by blocks 806-814. In block 804, the component invokes a demand create component to generate a demand collection D[n,t] having N number of demand time series for a date range from a start date to an end date with T days. In some embodiments, only one demand collection is needed. In such a case, when this component is invoked when processing a supply strategy with multiple supply units, this component would invoke the demand create component only on the first invocation. In block 805, the component, for each demand time series, sets a need date to the date at which the demand equals the quantity Q of the supply unit. In block 806, the component invokes a delivery create component to generate a delivery date for each supply time series, given the order date. In blocks 807-809, the component loops, determining the cost associated with each supply time series given its delivery date. In block 807, the component selects the next time series. In decision block 808, if all the supply time series have already been selected, then the component continues at block 810, else the component continues at block 809. In block 809, the component invokes a calculate cost component, passing the need and delivery dates to generate a cost for the selected supply time series, and then loops to block 807 to select the next supply time series. In block 810, the component sets the expected cost for this iteration to the average cost of the time series. In block 811, the component calculates the gradient of the costs based on the expected cost of the prior iteration. In block 812, the component sets a date step size to a function of the gradient. The date step size increases as the gradient increases and decreases as the gradient decreases. In decision block 813, if the date step size is less than an accuracy threshold, then the component completes, returning the current order date as the optimal order date, else the component continues at block 814. In block 814, the component adjusts the order date by the date step size and increments the iteration counter and loops to block 806 to perform the next iteration.

Figure 9:
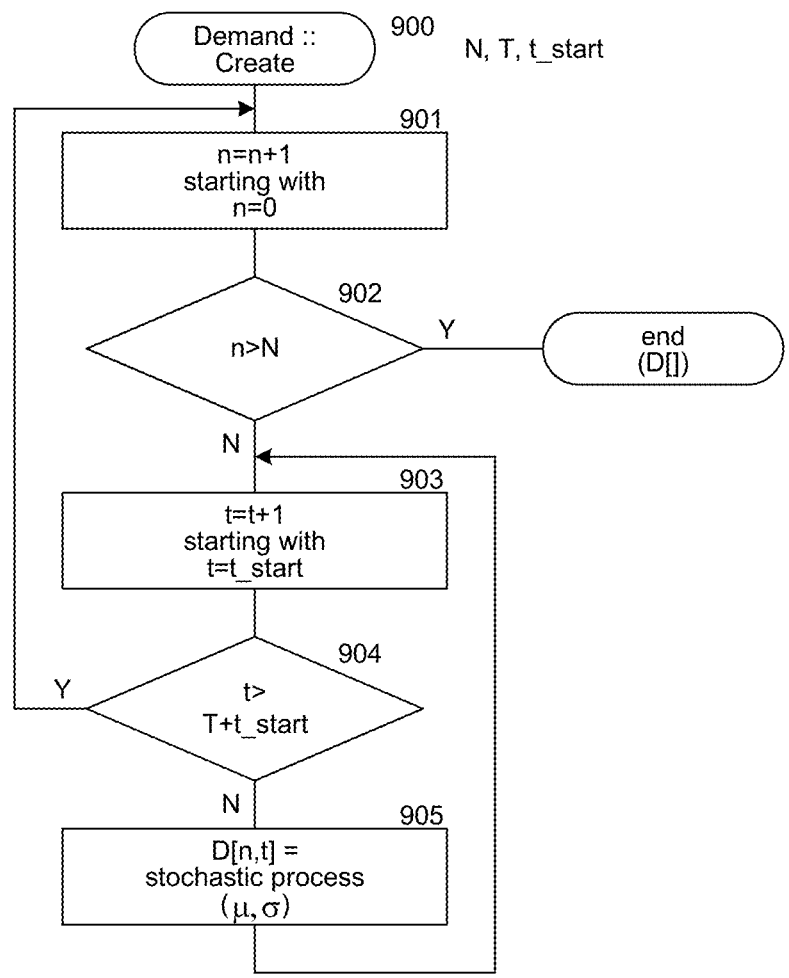
FIG. 9 is a flow diagram that illustrates the processing of a demand create component in some embodiments.

FIG. 9 is a flow diagram that illustrates the processing of a demand create component in some embodiments. The demand create component 900 is passed the number of demand time series to generate, the number of days in the time series, and a start date, and it generates a demand collection with the number of demand time series that each has the number of days. In block 901, the component increments an index for the demand time series. In decision block 902, if the index is greater than the number of time series to be generated, then the component completes with the demand collection, else the component continues at block 903. In block 903, the component increments an index for the dates in the date range starting with the start date. In decision block 904, if the index is greater than the number of days, then the component loops to block 901 to process the next demand time series, else the component continues at block 905. In block 905, the component sets the demand for the indexed time series and date based on a stochastic process using parameters set during the demand initialization. The component then loops to block 903 to increment the index into the date range.

Figure 10:
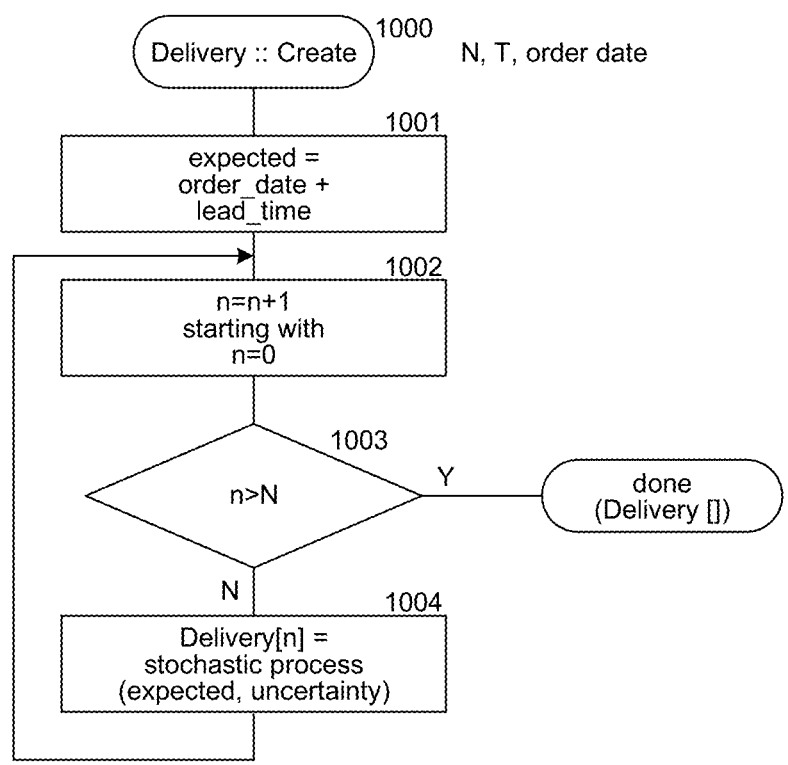
FIG. 10 is a flow diagram that illustrates the processing of a delivery create component in some embodiments.

FIG. 10 is a flow diagram that illustrates the processing of a delivery create component in some embodiments. The delivery create component 1000 is invoked passing the number of supply time series, the number of dates in a time series, an order date, and an indication of a supply unit. The component generates a delivery date for each supply time series given that order date. In block 1001, the component sets an expected date to the sum of the order date plus the lead time of the supply unit. In block 1002, the component initializes an index for the supply time series. In decision block 1003, if the index is greater than the number of supply time series, then the component completes with the delivery date for each supply time series, else the component continues at block 1004. In block 1004, the component sets the delivery date for the indexed supply time series using a stochastic process based on the expected date and an uncertainty calculated during initialization. The component then loops to block 1002 to index to the next supply time series.

Figure 11:
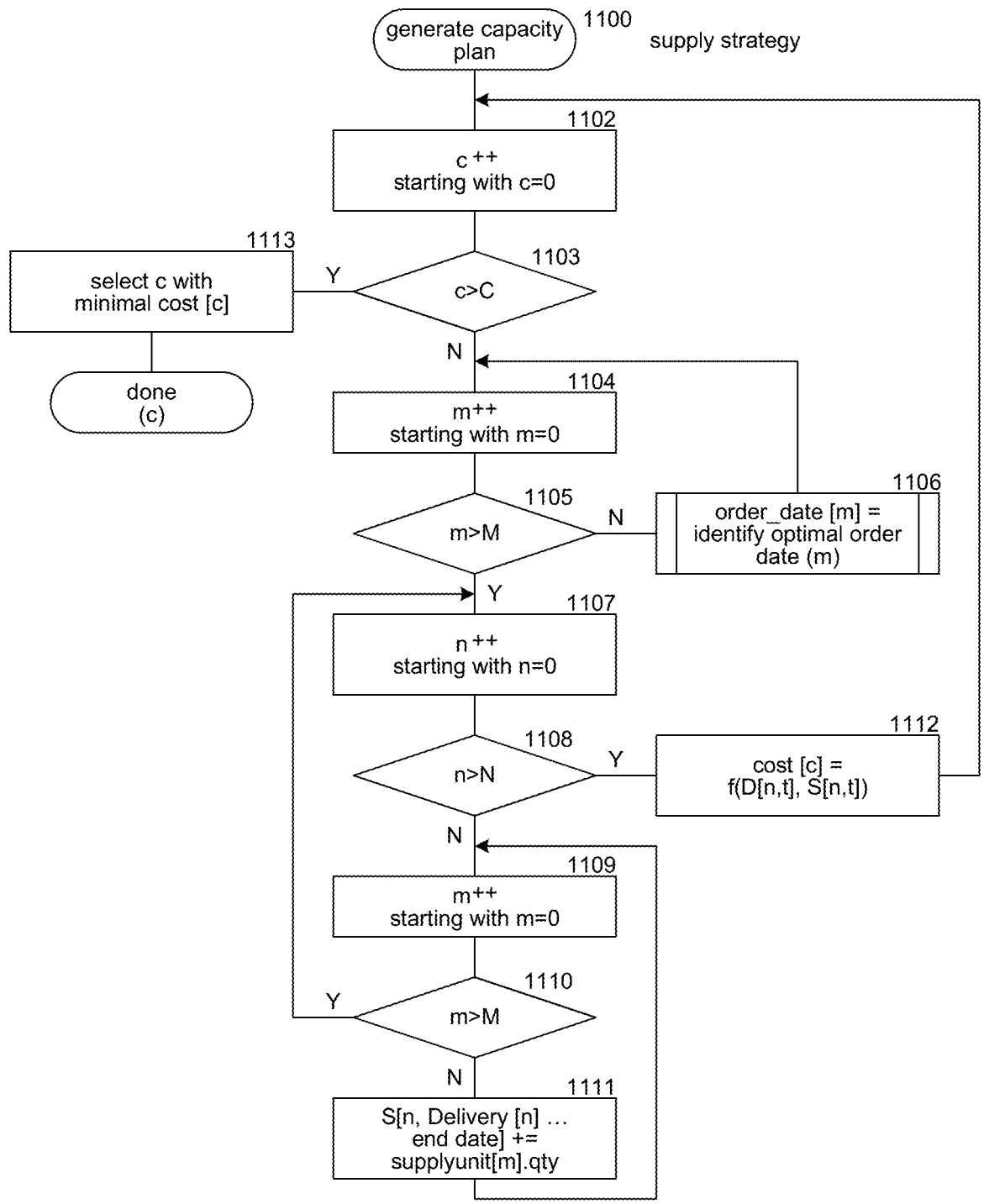
FIG. 11 is a flow diagram that illustrates the processing of a generate capacity plan component in some embodiments.

FIG. 11 is a flow diagram that illustrates the processing of a generate capacity plan component in some embodiments. The generate capacity plan component 1100 is passed a supply strategy with multiple supply units and generates a capacity plan for that supply strategy. In block 1102, the component initializes an index c into a number of iterations. In decision block 1103, if the index is greater than the number of iterations, then the component continues at block 1113, else the component continues at block 1104. In blocks 1104-1106, the component loops generating the optimal order date for each supply unit in the supply strategy. In block 1104, the component increments an index m for the supply unit. In decision block 1105, if the index is greater than the number of supply units, then the component continues at block 1107, else the component continues at block 1106. In block 1106, the component invokes the identify optimal order date component to generate the optimal order date for the indexed supply unit and then loops to block 1104. In block 1107, the component increments an index n into time series. In decision block 1108, if the index is greater than the number of time series, then the component continues at block 1112, else the component continues at block 1109. In block 1109, the component increments the index into the supply units. In decision block 1110, if the index is greater than the number of supply units, then the component loops to block 1107 to index to the next time series, else the component continues at block 1111. In block 1111, the component adds to a supply collection S[n,t] the quantity of the indexed supply unit for every date greater than the delivery date (order date plus lead time of the indexed supply unit) of the time series. The component then loops to block 1109. In block 1112, the component calculates the cost based on the demand collection and the supply collection and loops to block 1102 to select the next time series. In block 1113, the component selects the supply time series with the minimum cost created during iteration with the minimum cost and completes with that cost.

Figure 12:
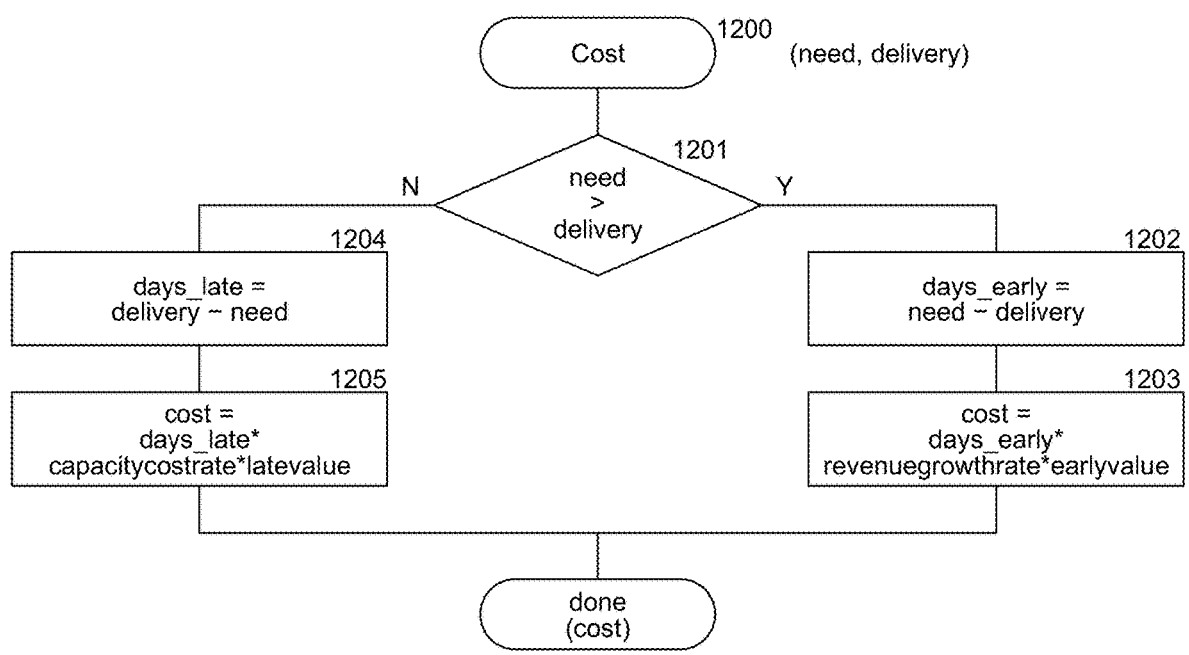
FIG. 12 is a flow diagram that illustrates the processing of a cost component in some embodiments.

FIG. 12 is a flow diagram that illustrates the processing of a cost component in some embodiments. The cost component 1200 is passed a need date and delivery date for a time series. In decision block 1201, if the need date is greater than the delivery date, then an overcapacity is indicated and the component continues at block 1202, else an undercapacity is indicated and the block continues at 1204. In block 1202, the component calculates the number of days by which the delivery is early. In block 1203, the component sets the cost associated with the overcapacity based on the number of days early, the revenue growth rate, and an early value parameter and then completes with the cost. In block 1204, the component calculates the number of days by which the delivery is late. In block 1205, the component calculates the cost based on the number of days late, a capacity cost rate, and a late value parameter and completes with the cost.

The following paragraphs describe various embodiments of aspects of the RP system. An implementation of the RP system may employ any combination of the embodiments. The processing described below may be performed by a computing device with a processor that executes computer-executable instructions stored on a computer-readable storage medium that implements the RP system.

A method performed by one or more computing systems for generating a capacity plan is provided. The capacity plan provides a timing for supply of a resource to meet demand for that resource. The method generates a demand collection of demand time series. Each demand time series providing a forecast of demand for the resource at dates within the demand time series. The demand collection is generated based on a stochastic process based on factors relating to historical information and future goals. The method generates a supply collection of supply time series. Each supply time series in a supply collection provides a forecast for delivery dates for the supply of the resource for dates within the supply time series based on order dates for the supply. The supply collection is generated based on a stochastic process that factors in factors relating to quantity of a supply unit and uncertainty in order lead time. The method identifies a supply time series that minimizes a cost, the cost represented by a cost function that is based on costs associated with delivery of supply at times other than the time at which supply is needed to meet demand as indicated by the demand collection and the supply collection. The method outputs an indication of an order date that the identified supply time series is based on. In some embodiments, the capacity plan is generated for a strategy that specifies supply units, each supply unit specifying a quantity of the resource, a lead time, and a cost for the quantity. In some embodiments, the costs include carrying costs and loss opportunity costs. In some embodiments, the identifying of the supply time series includes applying a gradient descent technique to adjust the order date to identify an optimal order date based on minimizing the cost. In some embodiments, the demand collection is based on milestones for revenue and productivity. In some embodiments, the demand collection is based on adoption of technology. In some embodiments, the uncertainty in order lead time is based on sentiment relating to whether a supplier of the resource will deliver the resource within a timeframe set by the supplier. In some embodiments, the sentiment is based on data collected from publications relating to the suppler. In some embodiments, the method further generates a modified capacity plan based on a modified factor and indicating a modified order date associated with the modified capacity plan wherein differences in costs represent sensitivity to the modified factor. In some embodiments, multiple factors have modified values that are different from values used to generate the capacity plan and the method further generates new capacity plans based on different combinations of the multiple factors having unmodified and modified values and indicating costs associated with each new capacity plan. In some embodiments, the resource is an information technology resource of a data center. In some embodiments, the data center is cloud-based.

In some embodiments, a method performed by one or more computing systems for generating a capacity plan is provided. The capacity plan provides a timing for supply of a resource to meet demand for that resource. The method forecasts forecasting one or more demand scenarios that each indicates demand over time for the resource by applying a stochastic process that factors in factors relating to historical information, future goals, and uncertainty in demand. The method forecasts forecasting a plurality of supply scenarios, each indicating supply over time for the resource by applying a stochastic process that factors in factors relating to quantity of supply units of the resource and uncertainty in supply. The method identifies a supply scenario that minimizes costs relating to delivery of supply at times other than the times at which supply is needed to meet demand based on the one or more demand scenarios. The method outputs an indication of the identified supply scenario. In some embodiments, the capacity plan is generated for a strategy that specifies supply units, each supply unit specifying a quantity of the resource, a lead time, and a cost for the quantity. In some embodiments, the costs include carrying costs and loss opportunity costs. In some embodiments, the identifying of the supply scenario includes applying a gradient descent technique to adjust an order date for the supply scenario to identify an optimal order date based on minimizing the costs. In some embodiments, the forecasting of demand is based on milestones for revenue and productivity. In some embodiments, the demand is based on adoption of technology. In some embodiments, the uncertainty in supply is based on sentiment relating to whether a supplier of the resource will deliver the resource within a timeframe set by the supplier. In some embodiments, the wherein the sentiment is based on data collected from publications relating to the suppler. In some embodiments, the method further generates a modified capacity plan based on a modified factor and indicating a modified scenario associated with the modified capacity plan wherein differences in costs represent sensitivity to the modified factor. In some embodiments, the method further generates a new capacity plan based on changed factors with changed values that are different from original values used in generating the capacity plan and generating other new capacity plans based on different combinations of the changed factors having original values and modified values and indicating costs associated with each new capacity plan. In some embodiments, the resource is an information technology resource of a data center. In some embodiments, the data center is cloud-based. In some embodiments, the resource is supplied via a supply chain with multiple suppliers in the supply chain. In some embodiments, the method further sends orders to one or more suppliers of the resource. In some embodiments, the forecasting of a demand scenario is based on historical usage of the resource. In some embodiments, the forecasting based on historical usage applies a regression demand model. In some embodiments, the forecasting based on historical usage applies a neural network demand model. In some embodiments, the forecasting of a demand scenario is based on a project that uses the resource.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by one or more computing systems for generating a capacity plan ensuring availability of information technology resources of a cloud data center, the capacity plan providing a timing for supply of the information technology resource to meet demand for that resource, the method comprising:
  generating a demand collection of demand time series, each demand time series providing a forecast of demand for the resource at dates within the demand time series, the demand collection generated based on a stochastic process based on factors relating to historical information and future goals, the stochastic process including for each of a plurality of revenue milestones:
    sampling a probability distribution of possible dates when a revenue milestone will be reached;
    for each sampled date, calculating average daily growth rate to reach the revenue milestone; and
    generating a revenue collection of revenue time series that is based on a randomization process with an expected value and variance based on the average daily growth rate;
  generating a supply collection of supply time series, each supply time series in a supply collection providing a forecast for delivery dates for the supply of the resource for dates within the supply time series based on order dates for the supply, the supply collection generated based on a stochastic process that factors in factors relating to quantity of a supply unit and uncertainty in order lead time;
  identifying a supply time series that minimizes a cost, the cost represented by a cost function that is based on costs associated with delivery of supply at times other than the time at which supply is needed to meet demand as indicated by the demand collection that is based on the revenue collection and the supply collection; and
  outputting an indication of an order date that the identified supply time series is based on.

2. The method of claim 1 wherein the capacity plan is generated for a strategy that specifies supply units, each supply unit specifying a quantity of the resource, a lead time, and a cost for the quantity.

3. The method of claim 1 wherein the costs include carrying costs and loss opportunity costs.

4. The method of claim 1 wherein the identifying of the supply time series includes applying a gradient descent technique to adjust the order date to identify an optimal order date based on minimizing the cost.

5. The method of claim 1 wherein the demand collection is based on milestones for revenue and productivity.

6. The method of claim 1 wherein the demand collection is based on adoption of technology.

7. The method of claim 1 wherein the uncertainty in order lead time is based on sentiment relating to whether a supplier of the resource will deliver the resource within a timeframe set by the supplier.

8. The method of claim 7 wherein the sentiment is based on data collected from publications relating to a supplier.

9. The method of claim 1 further comprising generating a modified capacity plan based on a modified factor and indicating a modified order date associated with the modified capacity plan wherein differences in costs represent sensitivity to the modified factor.

10. The method of claim 1 wherein multiple factors have modified values that are different from values used to generate the capacity plan and further comprising generating new capacity plans based on different combinations of the multiple factors having unmodified and modified values and indicating costs associated with each new capacity plan.

11. A method performed by one or more computing systems for generating a capacity plan ensuring availability of information technology resources of a cloud data center, the capacity plan providing a timing for supply of the information technology resource to meet demand for that resource, the method comprising:
  training a neural network with training data that includes feature vectors of usage data for a sequence of time periods labeled with usage data for a subsequent sequence of time periods, wherein the neural network outputs a mean and variance for the usage data;
  forecasting one or more demand scenarios, each indicating demand over time for the resource by applying a stochastic process that factors in factors relating to historical information, future goals, and uncertainty in demand, wherein the forecasting of one or more demand scenarios is based on sampling a probability distribution for possible usages for sequence of time periods based on the mean and variance output by the neural network for that sequence of time periods;

forecasting a plurality of supply scenarios, each indicating supply over time for the resource by applying a stochastic process that factors in factors relating to quantity of supply units of the resource and uncertainty in supply;

identifying a supply scenario that minimizes costs relating to delivery of supply at times other than the times at which supply is needed to meet demand based on the one or more demand scenarios; and outputting an indication of the identified supply scenario.

12. The method of claim 11 wherein the capacity plan is generated for a strategy that specifies supply units, each supply unit specifying a quantity of the resource, a lead time, and a cost for the quantity.

13. The method of claim 11 wherein the costs include carrying costs and loss opportunity costs.

14. The method of claim 11 wherein the identifying of the supply scenario includes applying a gradient descent technique to adjust an order date for the supply scenario to identify an optimal order date based on minimizing the costs.

15. The method of claim 11 wherein the forecasting of demand is based on milestones for revenue and productivity.

16. The method of claim 11 wherein the demand is based on adoption of technology.

17. The method of claim 11 wherein the uncertainty in supply is based on sentiment relating to whether a supplier of the resource will deliver the resource within a timeframe set by the supplier.

18. The method of claim 17 wherein the sentiment is based on data collected from publications relating to a supplier.

19. The method of claim 11 further comprising generating a modified capacity plan based on a modified factor and indicating a modified scenario associated with the modified capacity plan wherein differences in costs represent sensitivity to the modified factor.

20. The method of claim 11 further comprising generating a new capacity plan based on changed factors with changed values that are different from original values used in generating the capacity plan and generating other new capacity plans based on different combinations of the changed factors having original values and modified values and indicating costs associated with each new capacity plan.

21. The method of claim 11 wherein the resource is supplied via a supply chain with multiple suppliers in the supply chain.

22. The method of claim 11 further comprising sending orders to one or more suppliers of the resource.

23. The method of claim 11 wherein the forecasting of a demand scenario is based on historical usage of the resource.

24. The method of claim 23 wherein the forecasting based on historical usage applies a regression demand model.

25. The method of claim 23 wherein the forecasting based on historical usage applies a neural network demand model.

26. The method of claim 11 wherein the forecasting of a demand scenario is based on a project that uses the resource.

27. One or more computing systems for generating a capacity plan ensuring availability of information technology resources of a cloud data center, the capacity plan providing a timing for supply of the information technology resource to meet demand for that resource, the one or more computing systems comprising:

one or more computer-readable storage media storing computer-executable instructions that when executed by the one or more computing systems cause the one or more computing systems to:
generate demand scenarios, each demand scenario indicating forecasted demand over time for the resource by applying a stochastic process that factors in factors relating to historical information, future goals, and uncertainty in demand, the stochastic process including for each of a plurality of revenue milestones:
sampling a probability distribution of possible dates when a revenue milestone will be reached;
for each sampled date, calculating average daily growth rate to reach the revenue milestone; and
generating a revenue collection of revenue time series that is based on a randomization process with an expected value and variance based on the average daily growth rate;
generate supply scenarios, each supply scenario indicating forecasted supply over time for the resource by applying a stochastic process that factors in factors relating to quantity of supply units of the resource and uncertainty in supply;
identify a supply scenario that minimizes costs relating to delivery of supply at times other than the times at which supply is needed to meet demand based on the demand scenarios; and
output an indication of the identified supply scenario as the capacity plan; and
one or more processors that control execution of the computer-executable instructions.

28. The one or more computing systems of claim 27 wherein the capacity plan is generated for a strategy that specifies supply units, each supply unit specifying a quantity of the resource, a lead time, and a cost for the quantity.

29. The one or more computing systems of claim 27 wherein the costs include carrying costs and loss opportunity costs.

30. The one or more computing systems of claim 27 wherein the identifying of the supply scenario includes applying a gradient descent technique to adjust an order date for the supply scenario to identify an optimal order date based on minimizing the costs.

31. The one or more computing systems of claim 27 wherein the forecasting of demand is based on milestones for revenue and productivity.

32. The one or more computing systems of claim 27 wherein the demand is based on adoption of technology.

33. The one or more computing systems of claim 27 wherein the uncertainty in supply is based on sentiment relating to whether a supplier of the resource will deliver the resource within a timeframe set by the supplier.

34. The one or more computing systems of claim 33 wherein the sentiment is based on data collected from publications relating to a supplier.

35. The one or more computing systems of claim 27 further comprising generating a modified capacity plan based on a modified factor and indicating a modified scenario associated with the modified capacity plan wherein differences in costs represent sensitivity to the modified factor.

36. The one or more computing systems of claim 27 further comprising generating a new capacity plan based on changed factors with changed values that are different from original values used in generating the capacity plan and generating other new capacity plans based on different combinations of the changed factors having original values and modified values and indicating costs associated with each new capacity plan.

37. The one or more computing systems of claim 27 wherein the resource is supplied via a supply chain with multiple suppliers in the supply chain.

38. The one or more computing systems of claim 27 further comprising sending orders to one or more suppliers of the resource.

39. The one or more computing systems of claim 27 wherein the forecasting of a demand scenario is based on historical usage of the resource.

40. The one or more computing systems of claim 39 wherein the forecasting based on historical usage applies a regression demand model.

41. The one or more computing systems of claim 39 wherein the forecasting based on historical usage applies a neural network demand model.

42. The one or more computing systems of claim 27 wherein the forecasting of a demand scenario is based on a project that uses the resource.

43. One or more computing systems for ensuring availability of servers in a cloud data center to meet demand for servers, the one or more computing systems comprising:
  one or more computer-readable storage media storing computer-executable instructions that when executed by the one or more computing systems cause the one or more computing systems to:
    generate server demand scenarios for servers that are based on historical usage of servers in the cloud data center, each demand scenario providing a forecast of demand for servers over time, the server demand scenarios generated by applying a stochastic process that factors in historical information on demand of servers and uncertainty in future demand of servers, the stochastic process including for each of a plurality of revenue milestones:
      sampling a probability distribution of possible dates when a revenue milestone will be reached;
      for each sampled date, calculating average daily growth rate to reach the revenue milestone; and
      generating a revenue collection of revenue time series that is based on a randomization process with an expected value and variance based on the average daily growth rate;
    generate server availability scenarios for servers that are based on forecasted availability of servers over time by applying a stochastic process that factors in quantity of servers and uncertainty in availability of servers;
    identify a quantity of servers to meet the demand for servers based on the demand scenarios and server availability scenarios and based on minimization of overcapacity of servers and undercapacity of servers needed to meet the demand for servers; and
    directing that the identified quantity of severs is available to meet the demand for servers; and
  one or more processors that control execution of the computer-executable instructions.

44. The one or more computing systems of claim 43 wherein the demand factors in a productivity increase in a computer program.

45. The one or more computing systems of claim 44 wherein the productivity is based on processing of the computer program that is performed by a graphics processing unit (GPU).

46. The one or more computing systems of claim 43 wherein the instructions further comprise instructions that cause the one or more computing systems to:
  access data based on historical usage of servers;
  generate training data that includes feature vectors with features relating to usage over a first time period and labels for the feature vectors relating to usage over a second time period that is later than the first time period;
  train a neural network using the training data; and
  employ the trained neural network to sample usages when generating the server demand scenarios.

* * * * *